(12) United States Patent
Kinoshita (10) Patent No.: US 6,640,064 B2
(45) Date of Patent: Oct. 28, 2003

(54) IMAGE HEATING APPARATUS AND CONTROLLER

(75) Inventor: Hidehiko Kinoshita, Chiba-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/073,971

(22) Filed: Feb. 14, 2002

(65) Prior Publication Data

US 2002/0114638 A1 Aug. 22, 2002

(30) Foreign Application Priority Data

Feb. 16, 2001 (JP) .......................................... 2001-040120

(51) Int. Cl.[7] .............................................. G03G 15/20
(52) U.S. Cl. .......................... 399/69; 219/216; 219/494; 399/33
(58) Field of Search ................................ 399/69, 67, 33, 399/320; 219/216, 494, 502, 510; 347/156; 430/124

(56) References Cited

U.S. PATENT DOCUMENTS 6,222,158 B1 * 4/2001 Nakata et al. ............... 219/216

2002/0061202 A1 * 5/2002 Kataoka ...................... 399/69

FOREIGN PATENT DOCUMENTS

JP 05-210333 * 8/1993
JP 06-202512 * 7/1994

* cited by examiner

Primary Examiner—Sophia S. Chen
(74) Attorney, Agent, or Firm—Fitzpatrick, Cella, Harper & Scinto (57) ABSTRACT

An image heating apparatus has a heat generating element for generating heat upon electric energization; a substrate supporting the heat generating element; a temperature detecting member for detecting a temperature of the substrate; an A/D converter for A/D conversion of an output of the temperature detecting member; a photo-coupler for converting an output of the A/D converter to a light signal and outputting the light signal; and an abnormality detecting unit for detecting an abnormal temperature on the basis of an output of the photo-coupler.

8 Claims, 10 Drawing Sheets

IMAGE HEATING APPARATUS AND CONTROLLER

Figure 12:
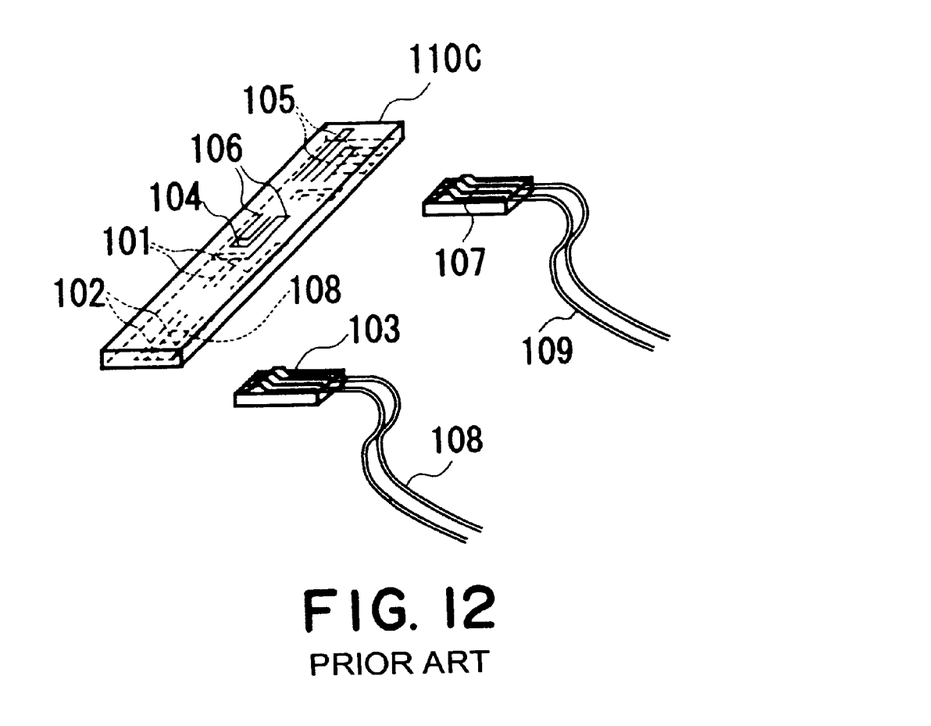
FIG. 12 shows a relationship between a heat generating element and a temperature detection member in a conventional heating apparatus.

The present invention relates to an image heating apparatus usable with a fixing device of an image forming apparatus such as a copying machine, printer or the like of an electrophotographic type electrostatic recording type. Referring first to FIG. 12, there is shown an example of an image heating device.

As shown in FIG. 12, a primary side heat generation pattern 101 (heat generating element) is provided on one of the surfaces of a ceramic plate 110C which is a substrate mainly comprising a ceramic material, and a chip thermister 104 (temperature detection member) is provided on the other surface of the ceramic plate 110C, so that primary side heat generation pattern 101 is supplied with electric power from a voltage source through a primary side wire 108, primary side electrode 102 and primary side connector 103, by which the heat is generated. A chip thermister 104 is connected to a micro computer or the like which is an external control means through a secondary side pattern 106, secondary side connector 107 and a secondary side wire 109.

However, in such an image heating apparatus, the electric energy consumption of the heat generation pattern 101 is normally large, and therefore, the commercial voltage source is used energizing it. The heat generation pattern 101 and the chip thermister 104 are primary and secondary side circuits. Then, a sufficient insulation distance is required between the heat generation pattern 101 and the chip thermister 104 for the purpose of protecting the user.

In such a heating apparatus, the primary side and the secondary example circuits are mixed, and therefore, as shown in FIG. 12, the primary side electrode 102 and the second side electrode 105 have to be disposed at one end and the other end, respectively, of the ceramic plate 110C. This reduces the latitude in design and liquid ejection leads to difficulty in downsizing.

If the primary side electrode 102 and the secondary side electrode 105 are both disposed at one side, it is required to use a larger ceramic plate 110C to assure the distance between the primary side electrode 102 and the secondary side electrode 105, and in addition, coating has to be made thicker to assure the withstand voltage between the primary side electric wire 108 and the secondary side electric wire 109, with the result of cost increase.

It is not possible to reduce the width of the ceramic plate 110 because the distance speculated in the relevant safety relation between the primary side electrode 102 and the secondary side electrode 105, and therefore, downsizing is difficult, and the ceramic material cannot be saved, with result of cost increase.

On the other hand, in the case of heat fixing device of a film heating type using as a heat source a thick film heat generating resistor formed on a ceramic plate, the temperature rise of the heater is quick, and therefore, quick start operation can be accomplished, and electric power consumption can be saved.

However, the small heater thermal capacity leads to the difficulty in control. Generally, a constant temperature control is effected in a heat fixing device in the image recording device, and an abrupt temperature change during image fixing operation is not preferable. In view of this, when a heat generating element is used as a heat source for the heat fixing device, the use is made with a heat generating element which having a rated electric power which is larger than the desired electric power value, in which the constant temperature control is accomplished using a phase control or a wave number control. Therefore, when the control circuit for the heat generating element fails such that electric energy is always supplied, the temperature of the heat generating element rises abruptly. If nothing is done against this, the fixing device smokes or fires sooner or later. In consideration of this, the heat fixing device is provided with a thermal protector such as a temperature fuse or the like.

However, the thermal capacity of the thermal protector such as a temperature fuse is generally large as compared with that of the heat generating element and/or the ceramic plate, and therefore, the response is slow. For this reason, the heater (the ceramic plate including the heat generating resistor) may be broken due to the heat stress prior to the operation of the thermal protector.

If this occurs, electric discharge occurs between film portions of the thick film heat generating resistor where it is broken. Since the temperature of the elements around the fixing device is high, the elements relatively easily smokes or fires. Therefore, even if the ceramic plate of the heater is broken due to the heat stress upon abnormal operation, the electric energy supply to the thick film heat generating resistor is stopped with certainty by means of circuit means, so that firing and smoking are prevented. Ordinarily, the circuit means for preventing the firing and smoking is disclosed that secondary side, that is, the temperature detection member side.

SUMMARY OF THE INVENTION

Accordingly, it is a principal object of the present invention to provide an image heating device having a high safety with respect to the heat generating element. It is another object of the present invention to provide an image heating device in which a sufficient distance can be assured between the heat generating element and the safety circuit for stopping electric energization upon abnormality. It is a further object of the present invention to provide an image heating device in which the temperature detecting member and the abnormality detecting means are connected through a photocoupler.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The preferred embodiments of the present invention will be described in conjunction with the accompanying drawings.

Figure 1:
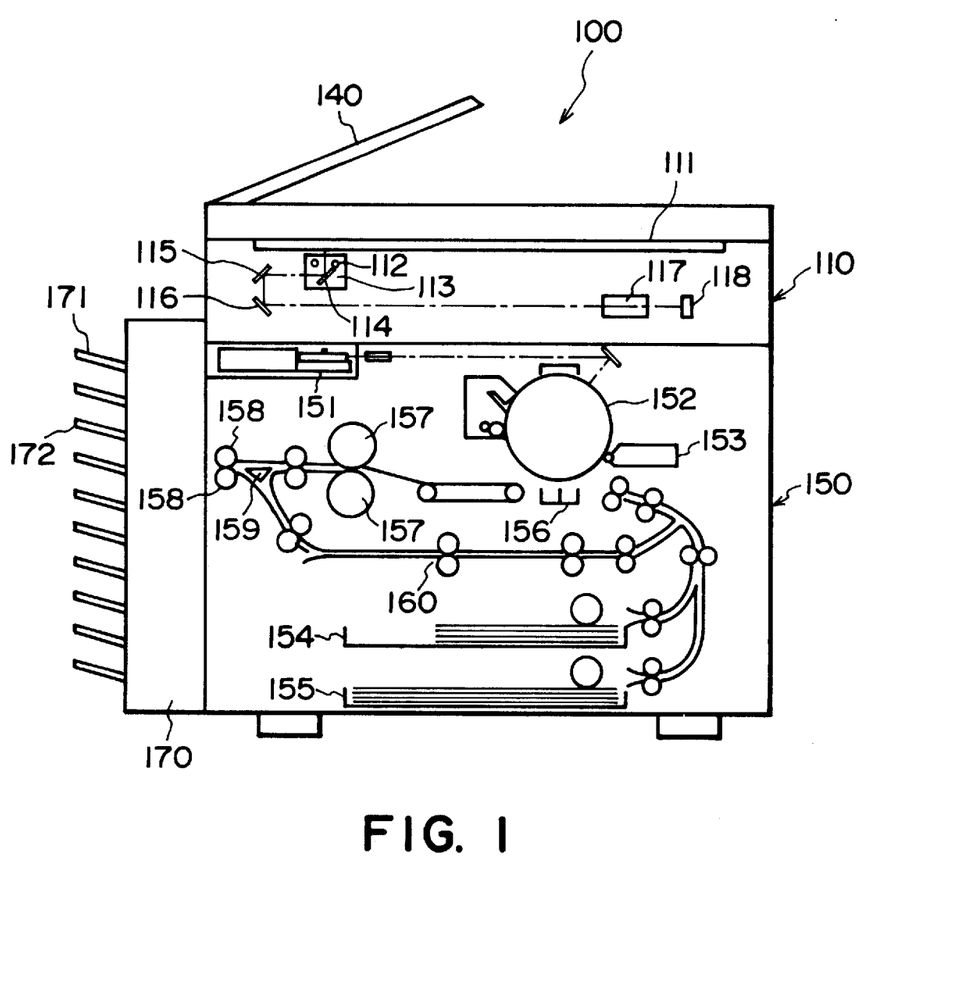
FIG. 1 is a longitudinal sectional view of a structure according to an embodiment of the present invention.

FIG. 1 is a longitudinal sectional view of an image forming apparatus (image processing device) according to an embodiment of the present invention, in which the image heating device is used as a fixing device.

In this Figure, designated by reference numeral 100 is a copying machine and comprises a reader portion 110 (image reading portion) and a printer portion 150 (image recording portion).

The reader portion 110 comprises an original feeding apparatus 140, and original supporting platen glass 111, a scanner, a lamp 112 in the scanner portion, a unit 113, mirrors 114, 115, 116, a lens 117, a CCD image sensor portion (which may be simply called "CCD") 118.

The printer portion 150 comprises an exposure controller 151, a photosensitive member 152, a developing device 153, a recording paper (transfer sheet) stacking portion 154, 155, a transfer portion 156, fixing portion 157, a sheet discharge portion 158, a feeding direction switching member 159, a stacking portion 160 for a reefed recording paper (transfer sheet), and a sorter 170.

The description will be made as to operations of the image forming apparatus.

In the Figure, a plurality of originals placed on an original feeding apparatus 140 of the reader portion 110, are sequentially fed to an original supporting platen glass 111 in seriatim. When the original is advanced to a predetermined position on the original supporting platen glass 111, the lamp 112 of the scanner portion is lit on, and the scanner unit 113 moves, and the original is illuminated by the lamp. The light reflected by the original i incident on the CCD118 by way of the mirrors 114, 115, 116 and the lens 117. The CCD118 effects a photoelectric conversion of the light received thereby to an image signal, which is outputted therefrom.

The image signal outputted from the CCD118 is supplied to the printer portion 150, and is subjected to a proper image processing, and thereafter is supplied to an exposure controller 151 (unshown). The exposure controller 151 functions to generate a light signal modulated in accordance with the image information, and the light signal is projected to the photosensitive member 152, by which a latent image is formed on the photosensitive member 152. The latent image formed on the photosensitive member 152 is developed by a developing device 153. In timed relation with the leading edge of the developed image, a recording paper is fed out from a recording paper stacking portion 154 or recording paper stacking portion 155, and the developed image is transfer onto the recording paper at a transfer portion 156.

The image transfer onto the recording paper is fixed on the recording paper by a fixing portion 157, and the recording paper is discharged to an outside of apparatus by a sheet discharge portion 158. The recording paper discharged from the sheet discharge portion 158 is fed to a proper one of pins 172 or the like when the sorting function of the sorter 170 is active, or to the topmost bin 171 of the sorter 170 when the sorting function is not active.

The description will be made as to the case in which the images sequentially read are formed on both sides of one recording paper.

The recording paper on which the image has been fixed by the fixing portion 157 is once discharged to a sheet discharge portion 158, and is reverted by a feeding direction switching member 159 and is refed to a recording paper stacking portion 160 for temporarily stacking the sheet to be refed. When the next original is prepared, the original image is read in the similar manner. However, as for the recording paper, the recording paper is fed from the refeeding recording paper stacking portion 160 for the sheet to be refed. Thus, two page image is are formed on the respective sides of one recording sheet.

Figure 2:
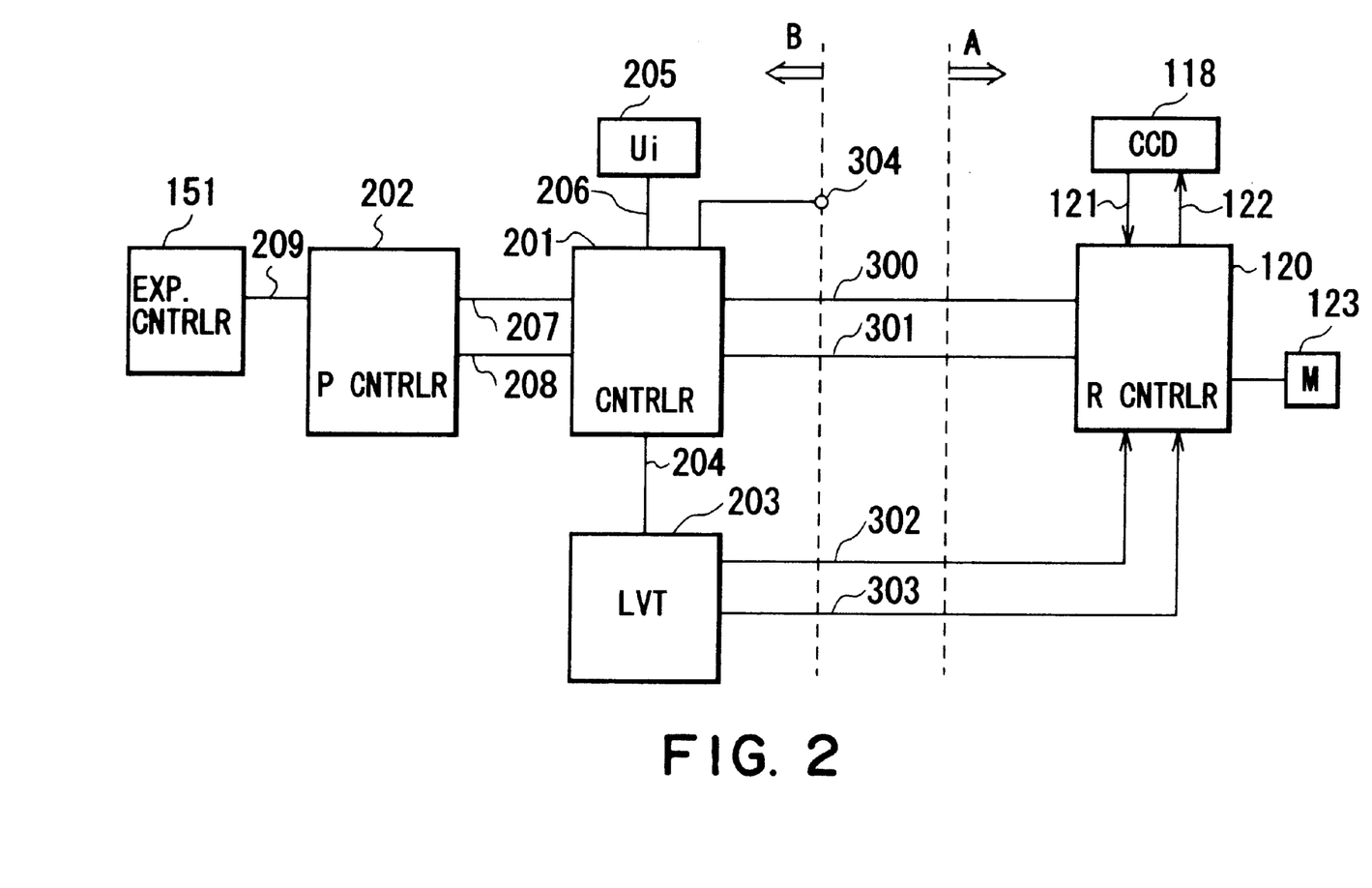
FIG. 2 is a block diagram of a controlled system according to an embodiment of the present invention.

FIG. 2 is a block diagram showing a structure of a controlled system for the copying machine 100 according to this embodiment. The same reference numerals are assigned to the corresponding elements, and the detailed description thereof are omitted for simplicity.

In this figure, portion A is contained in the reader portion 110, and portion B is contained in the printer portion 150.

The image data having been subjected to the photoelectric conversion in the CCD118 and the amplification and A/D conversion processing, are fed to a reader controller 120 through a line 121.

The reader controller 120 effects a shading correction to the received image data, and then feeds the data to a controller 201 through an image transfer bus 300. Various timing pulses for driving the CCD118 generated in the reader controller 120 are supply to the CCD118 through the line 122.

To the reader controller 120, a stepping motor 123 is connected. The reader controller 120 controls the stepping motor 123 to rotate it in the forward and backward directions so as to move the scanner unit 113 in the forward and backward directions to scan the original on the original supporting platen glass 111.

The controller 201 controls the whole of the printer portion 150 and the controller 201, and exchanges controlling data with the reader controller 120 through the data bus 301.

An user interface portion 205 comprises keys and display portion of LCD or the like. The input information by the keys are transmitted to the controller 201 via local bus 206, and receives display data from the controller 201 to display the data.

A low voltage power unit (LVT) 203 receives an AC voltage from a quotient use voltage source (unshown) and generates a low voltage under the control of the controller 201 via local bus 204. The low voltage source functions as a controlling voltage source (3.3V or the like) to be supplied to a controller such as a CPU and a power voltage source (24V or the like) for actuating the motor and the solenoid. The control voltage is supplied to the reader controller 120 through the line 302, and is supplied to the proper units in the printer portion 150 (unshown). The power voltage is supplied to the reader controller 120 through the line 303, and is supplied to the proper units in the printer portion 150.

The image data received from the reader controller 120 are subject to a variable magnification, and edge stressing, a binarization or the like in the controller 201, and thereafter are fed to a printer controller 202 through a line 207. Printer controller 202 executes paper feeding control and charging system control in the printer portion 150.

The printer controller 202 exchanges various control data with the controller 201 through a data bus 208.

In addition, it outputs the data receives through the line 207 to an image data bus 209 at proper timings for printing.

Designated by 151 is the exposure controller described in the foregoing. It effects control to emit a laser being (unshown) with a predetermined light quantity in accordance with the image data received through the image data bus 209 and timing signal, and the emitted laser beam is incident on the photosensitive member 152, so that they latent image is formed on the photosensitive member 152.

An external interface 304 communicates with the device is other than the copying machine 100, for example, a personal computer, and is connected with the controller 201.

Figure 3:
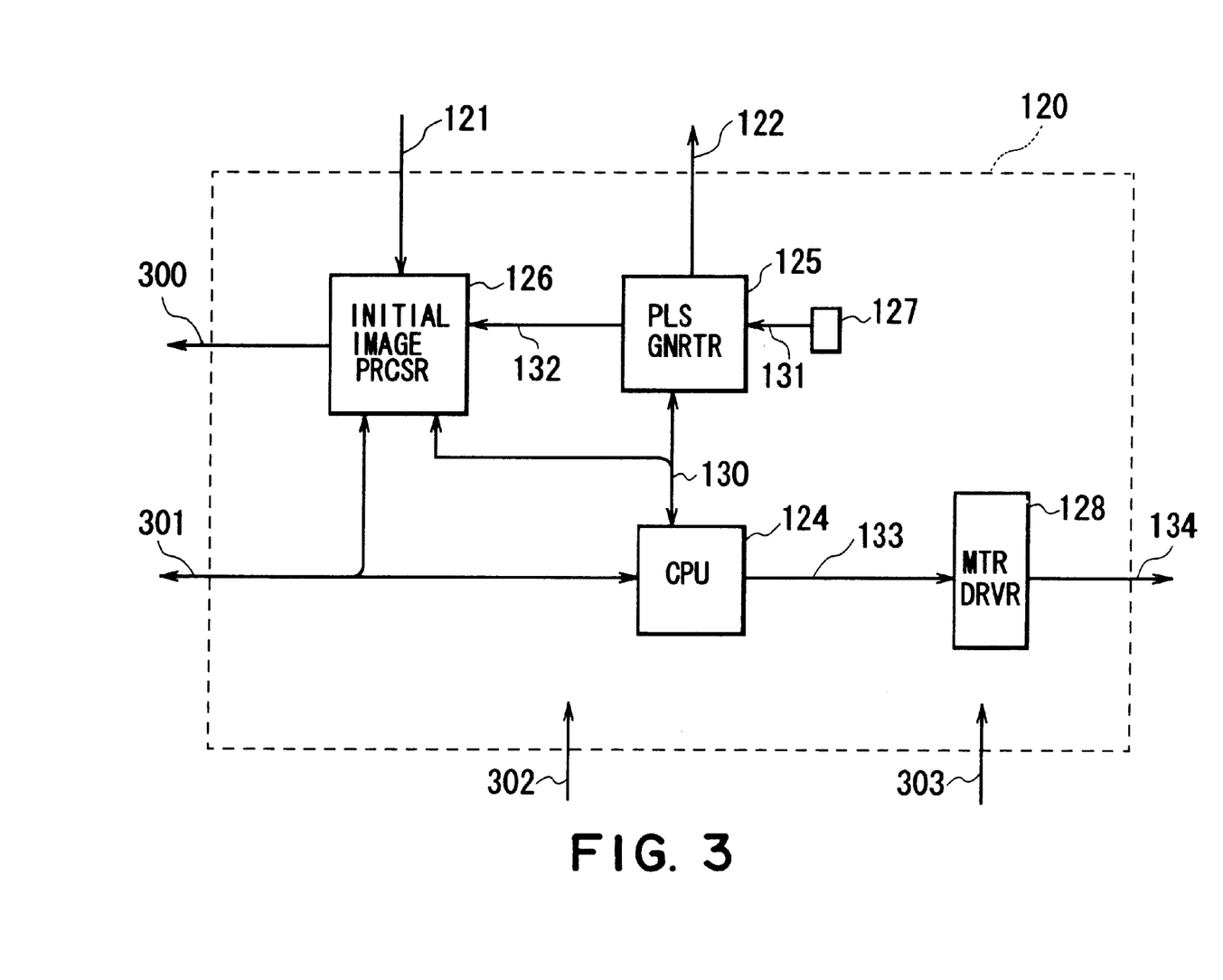
FIG. 3 is a block diagram of a reader controller shown in FIG. 2.

FIG. 3 is a block diagram of the reader controller 120 shown in FIG. 2.

In this Figure, the same reference numerals as in FIG. 2 are assigned to the corresponding elements, and the detailed description thereof is omitted for simplicity.

Designated by CPU124 controls the operations of the reader portion 110 and effects settings for a pulse generation device 125 and initial image processing device 126 through a local data bus 130, and produces operation timings. It exchanges data with the controller 201 through the data bus 301.

The CPU124 further controls the stepping motor 123 through a motor driver 128, using a motor control signal line 133.

The motor driver 128 actuates the stepping motor 123 through the motor driving line 134 in accordance with a motor clock signal indicative of the rotational speed of the stepping motor, contained in the motor control signal, and in accordance with a rotational direction signal and a driving enabling signal. The stepping motor 123 is an essayist through the power voltage source line 303.

The pulse generation device 125 receives clock signals via local bus 131 from an oscillator 127, and generates CCD timing signals in accordance with the setting of the CPU 124. It drives the CCD 118 through the line 122, and simultaneously, generates image clock signals in synchronism with the image data supplied from the CCD 118 through the line 121, and then, supplies the data to the initial image processing device 126 through the line 132. The speed of the image clock signals can be selectively switched by the CPU124 while keeping the synchronization with the CCD timing signals.

The initial image processing device 126 effects the shading process to the image data supplied from the CCD118 through the line 121 and feeds the data to the image transfer bus 300 in synchronism with the image clock signals.

The information signal relating to the image data contained in the data bus 301 is directly supplied to the initial image processing device 126, including the timing signal which is critical to the image data.

With this structure, the operation clock of the CPU124 and the image clock are not necessarily synchronized, and therefore, they can be independently selectable, including the synchronized clocks.

Figure 4:
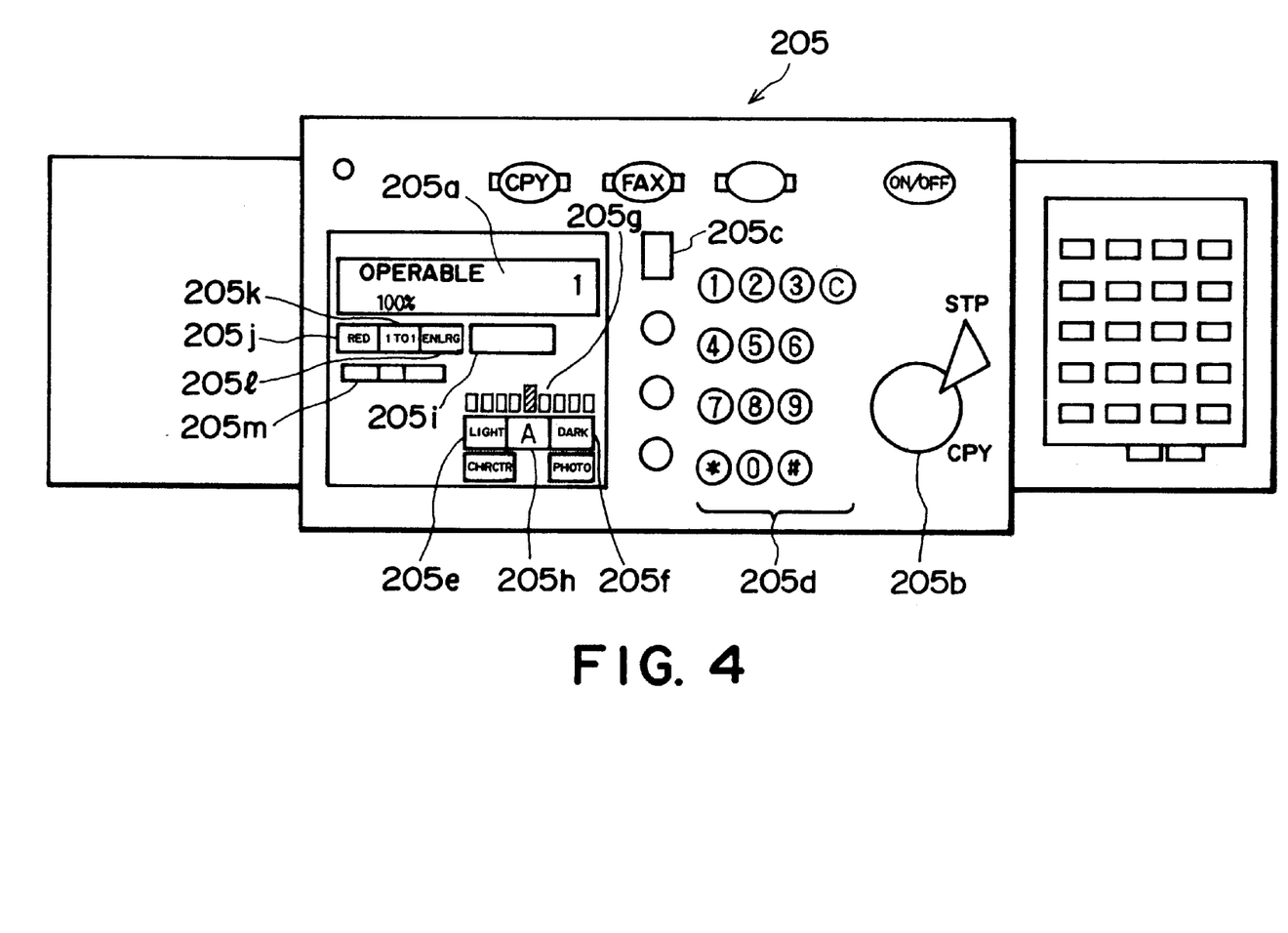
FIG. 4 is a plan view of an operating panel shown in FIG. 2.

FIG. 4 is a plan view of the user interface portion 205. As shown in this Figure, the user interface portion 205 comprises various keys and a display portion 205a in the form of a liquid crystal display device of dot matrix type.

The display portion 205a displays a state of copying machine, a number of copies to be taken, a magnification, a selection of sheet and various operation mode display, which are controlled various control keys which will be described hereinafter.

Designated by 205b is a start key and functions to start the copy operation. Designated by 205c is a reset key which functions to restore the set modes back to the standard modes. Designated by 205d are keys which include a ten-key (0–9) for setting the number of copies and the zoom magnification and a clear-key for canceling the input, and so on. Designated by 205e, 205f are density adjustment keys which function to raise or lower image density.

The density adjusted by the density adjustment keys 205e, 205f is displayed on the density display portion 205g in th form of a bar scale. Designated by 205h is a key actuating and deactuating the automatic density adjustment function, and a display therefore. Designated by 205i is a key for selecting a sheet feeding stage and automatic sheet selection mode, and the selected state is displayed on the display portion 205a. Designated by 205j, 205k, 205l are keys for selecting a predetermined reduction mode, a one-to-one mode and an enlarging mode, respectively. Designated by 205m is a key for setting an automatic variable magnification mode, and the selection of the automatic variable magnification mode is displayed on the display portion 205a.

Figure 5:
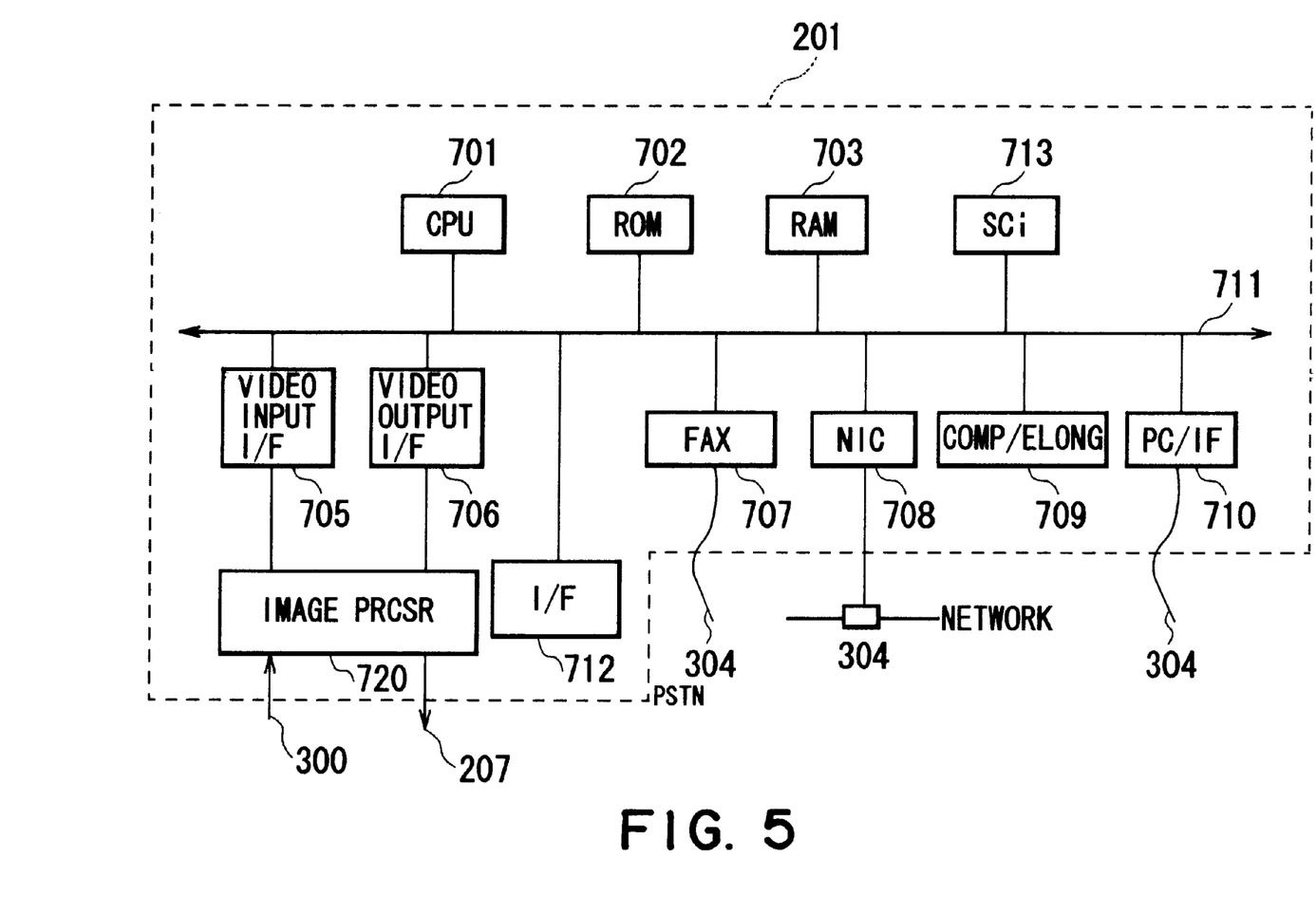
FIG. 5 is a block diagram of a controller shown in FIG. 2.

FIG. 5 is a block diagram of the controller 201. In this Figure, a CPU701 controls the whole system on the basis of the program stored in the ROM 702. Designated by RAM 703 is a work area of the CPU701, and is used for storing the image read by the scanner portion 110. Designated by 713 is a serial communication interface through which the CPU701 exchanges the information with the reader controller 120, LVT 204, Printer controller 202 via bus 711.

Designated by 710 is a PC I/F portion which may be a biCentronics interface or the like, and functions to receive print data from the personal computer and send the state of the copying machine 100 to the personal computer. Designated by 709 is a compressing/expanding portion for compressing or expanding the image data. It supports JBIG, MMR format or the like. Designated by 708 is an interface portion for network such as 10 base. CPU701 receives the print data from a computer on a network, and send the state of the copying machine 100 to the computer.

Designated by 707 is a facsimile machine portion including MODEM and line process circuit. Image data compressed with a predetermined format are sent or received through communication line (PSTN). Designated by 712 is an interface portion with the user interface 205 and contains a LCD controller. Through the CPU701, the display data is sent to the user interface 205, and the input data are received.

Designated by 720 is an image processor which receives the image data from the reader portion 110 through the image transfer bus 300.

In a video input I/F portion 705, the timing is converted and is stored in the RAM 703. On the other hand, the video output I/F portion 706 converts the timing. The image processor 720 process the image (which will be described hereinafter). Thereafter, the data are sent to the printer controller 202 through t image transfer bus 207.

Figure 6:
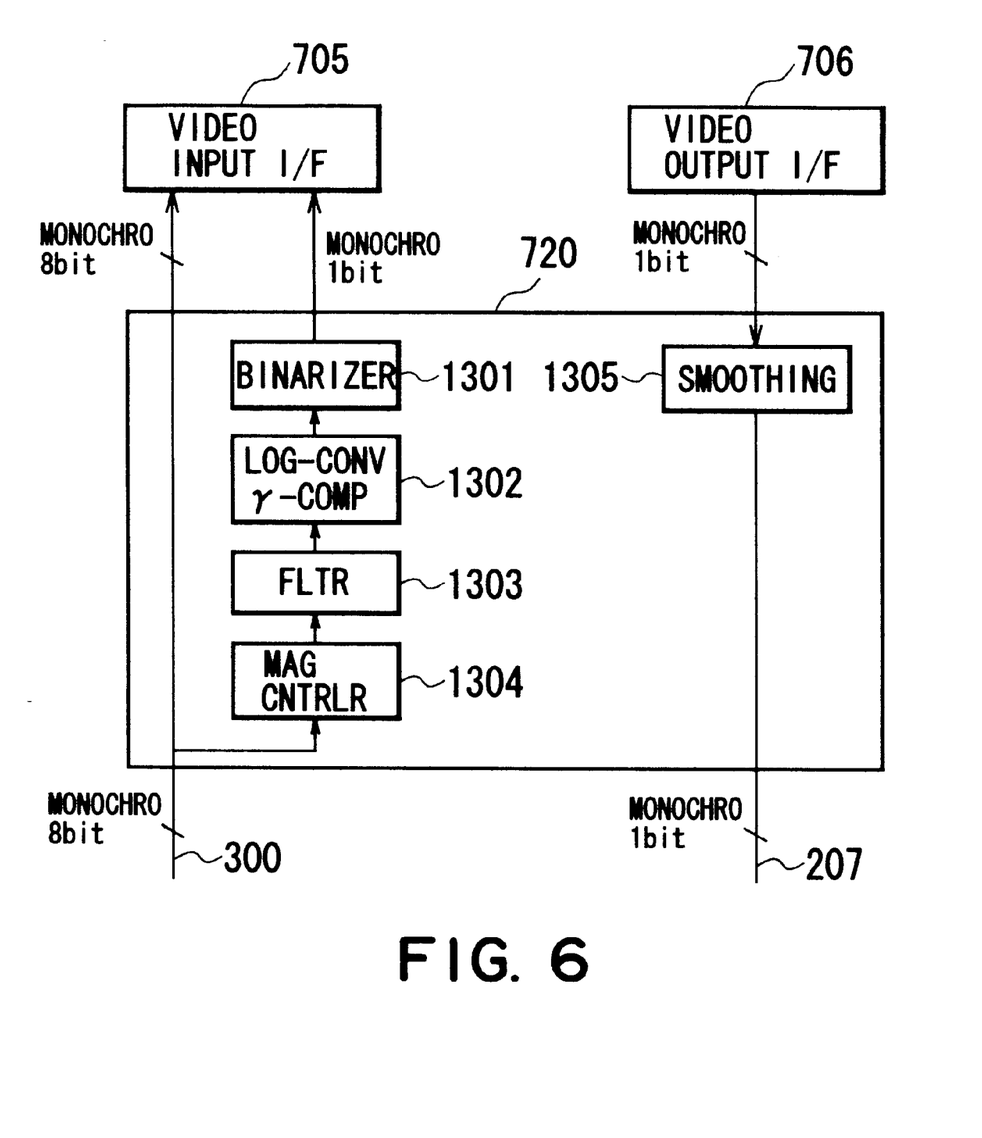
FIG. 6 is a block than ever of an image processor shown in FIG. 5.

FIG. 6 is a block diagram of the image processor 720. The 8 bit image data are sent to the video input I/F portion 705 as they are (image data 8 bit in a case, and are subjected to the following image processing in another case.

The variable magnification portion 1304 effects a variable magnification process including enlargement and reduction; the filter 1303 filters the data; a log-conversion and compensating portion 1302 effects the log-conversion in accordance with the properties of the printer or the like; and a binarizer 1301 binarizes the data with an algorithm such as an error diffusion method or the like.

The image data of 600 dpi from the video output I/F portion 706 are converted to psuedo 2400 dpi data and a smoothing circuit 1305 receives the output of video output I/F portion 706.

Figure 7:
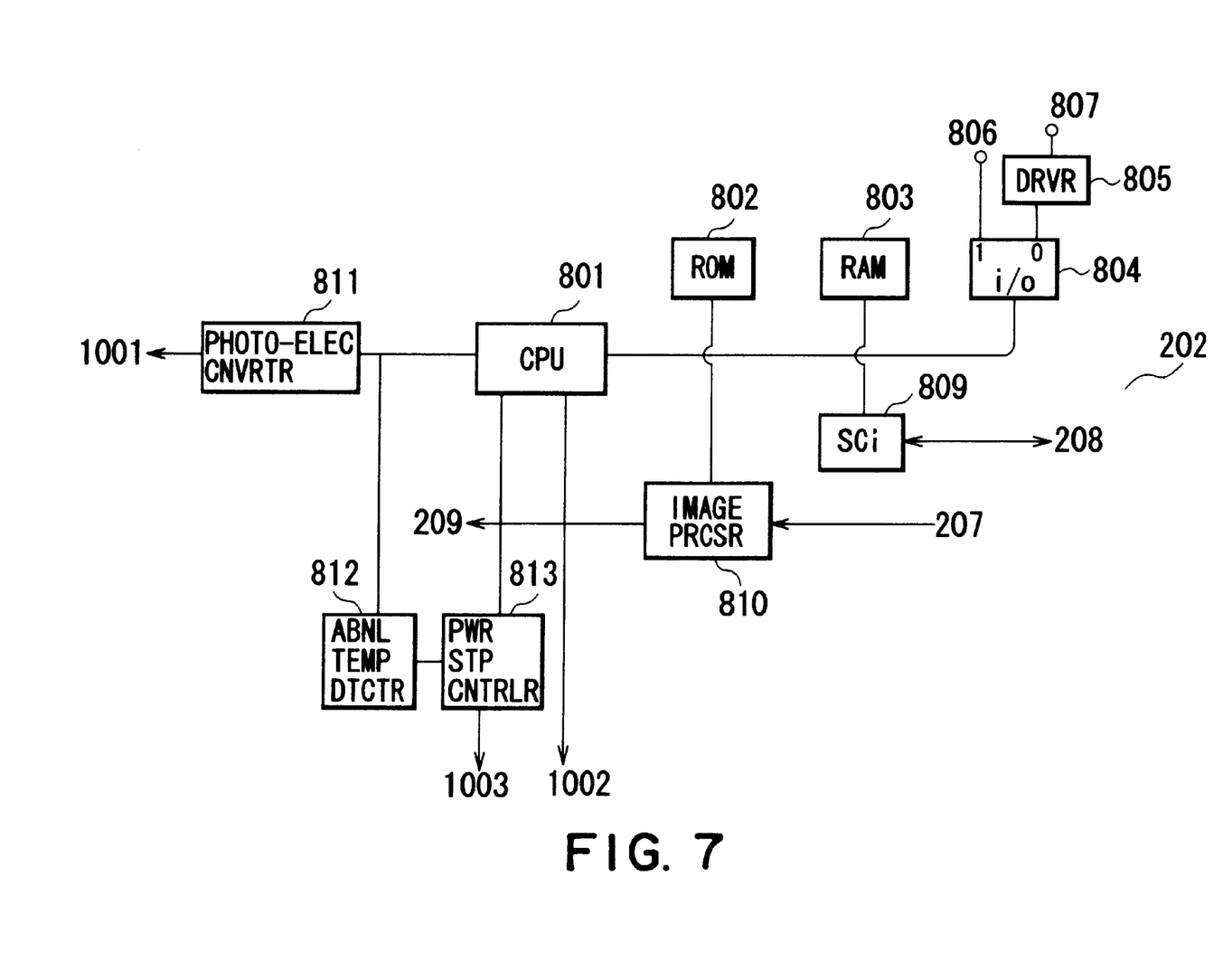
FIG. 7 is a block diagram of a reader controller shown in FIG. 2.

FIG. 7 is a block diagram of a printer controller 202. In this Figure, designated by 801 is a CPU for mechanical control for printer portion and is operable in accordance with the program stored in the ROM 802. Designated by 803 is a RAM used by the CPU801. Designated by 804 is an I/O port through which the outputs of the sensors 806 are read into the CPU801. The sensors 806 include a paper sensor for detecting presence or absence of the transfer sheet, for example.

The output from the output 804 is supplied to a driver 805 which outputs a proper drive voltages to the respective loads 807. The loads 807 include the fixing heater, the paper feeding motor, clutch, solenoid and so on.

Designated by 809 is serial communication interface through which the CPU801 exchanges information with the controller 201.

The serial communication interface 809 has a plurality of serial communication channels, and exchanges data with the sorter 170, an unshown paper deck, a cassette pedestal and so on.

The data provided by conversion of the information from the temperature detection member for detecting the temperature of the fixing portion 157 by the A/D converter is supplied to the I/O portion of the CPU801 through the photoelectric converting means 811, and the CPU801 controls the fixing heater in accordance with the detected temperature. The CPU801 further controls the voltage source blocking control circuit 813.

In case that abnormal temperature of the heat generating element is detected for some reason or another, the abnormal temperature detecting means 812 operates on the basis of the heat generating element temperature data sent thereto through the photoelectric converting means 811, and the voltage source blocking control means 813 is controlled to force the voltage source blocking mechanism to stop, thus stopping the electric energization to the heater.

The CPU810 supplies the image data fed from the controller 201 in the image processor to the exposure controller 151 in a timed relation in the main scan direction.

Figure 8:
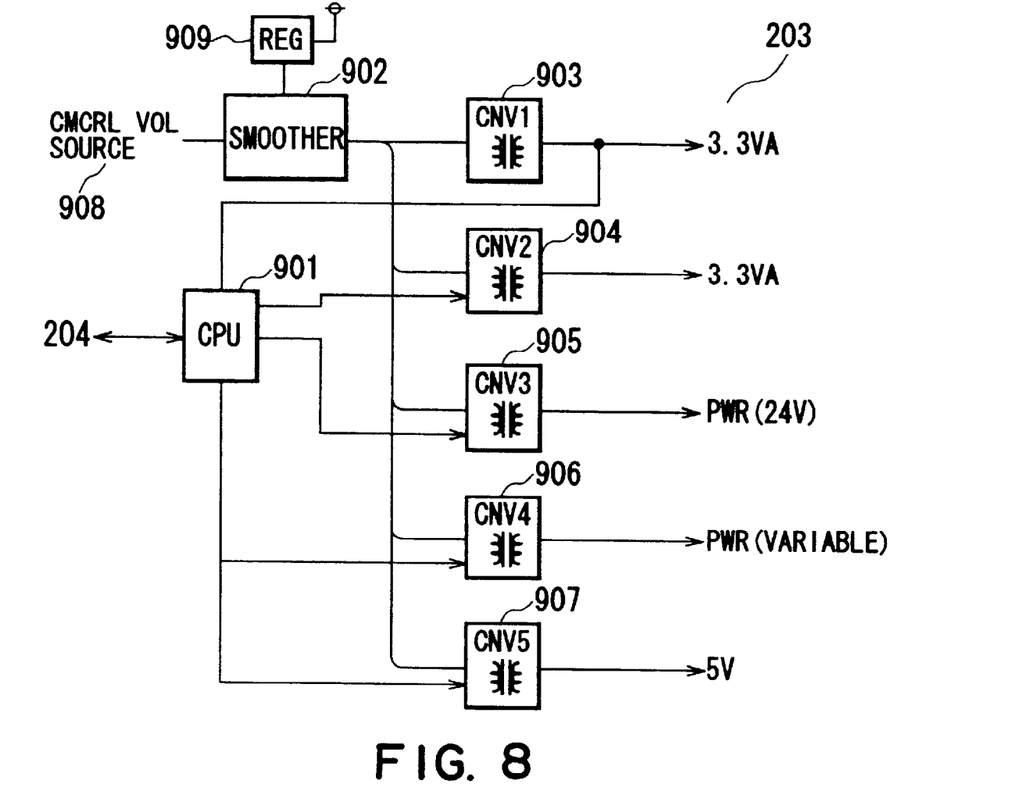
FIG. 8 is a block diagram illustrating structures of LVT shown in FIG. 2.

FIG. 8 is a block diagram of the LVT203. In the Figure, designated by CPU901 is a one-chip CPU which includes ROM, RAM for controlling the operation of the LVT203. The CPU901 exchanges information with the controller 201 through the line 204.

The commercial voltage source 908 is smoothed by a smoothing circuit 902, and the output thereof is supplied to DC/DC converter portions 903, 904, 905, 906, 907 (CNV (1), CNV (2), CNV (3), CNV (4) and CNV (5)).

The CNV (1) 903 is always in operation to provide the control voltage 3.3 VA. The voltage 3.3 VA is supplied to the CPU901.

The CNV (2) 904 generates 3.3 VB. The voltage can be on/off-controlled by the CPU901.

The CNV (3) 905 generates the power voltage (24V). The voltage can be on/off-controlled by the CPU901.

The CNV (4) 906 generates power voltage (variable between two levels). The voltage source can be ON/Off-controlled, and the output voltage thereof can be set. The CNV (4) 906 is provided with a current limiter circuit of which the limit current can be set by the CPU901.

The CNV (5) 907 produces 5V. The voltage can be on/off-controlled by the CPU901.

The regulator circuit (REG) 909 produces a primary voltage Vccl from a rectified voltage provided by the smoothing circuit 902.

Figure 9:
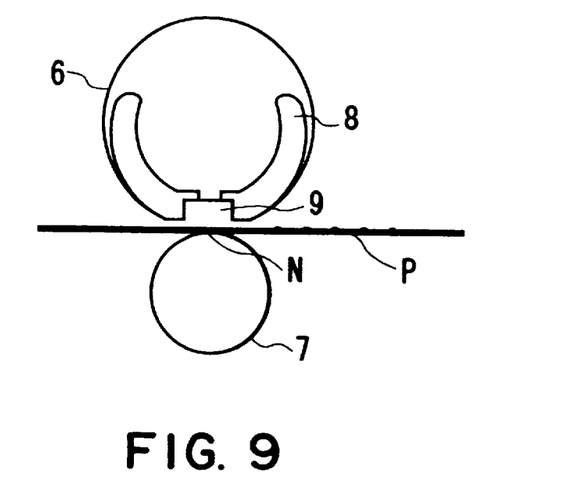
FIG. 9 is a schematic sectional view of a fixing device shown in FIG. 1.

FIG. 9 is a schematic sectional view of a fixing device 157 according to this embodiment. The fixing device 157 comprises a heating portion 9 (heating means), a supporting member 8 for fixedly supporting the heating portion 9, a heat resistive film 6 as a fixing rotatable member extended around the heating portion 9 and the supporting member 8, a pressing roller 7 in the form of a roller press-contacted to the heating portion 9 with the film 6 therebetween. The film 6 is rotated by the rotation of the pressing roller 7. The recording sheet P carrying an unfixed image is introduced into and passed through a nip N formed between the film 6 and the pressing roller 7, by which the unfixed image is fixed on the recording material by the heat from the heating portion 9 through the film 6.

Figure 10:
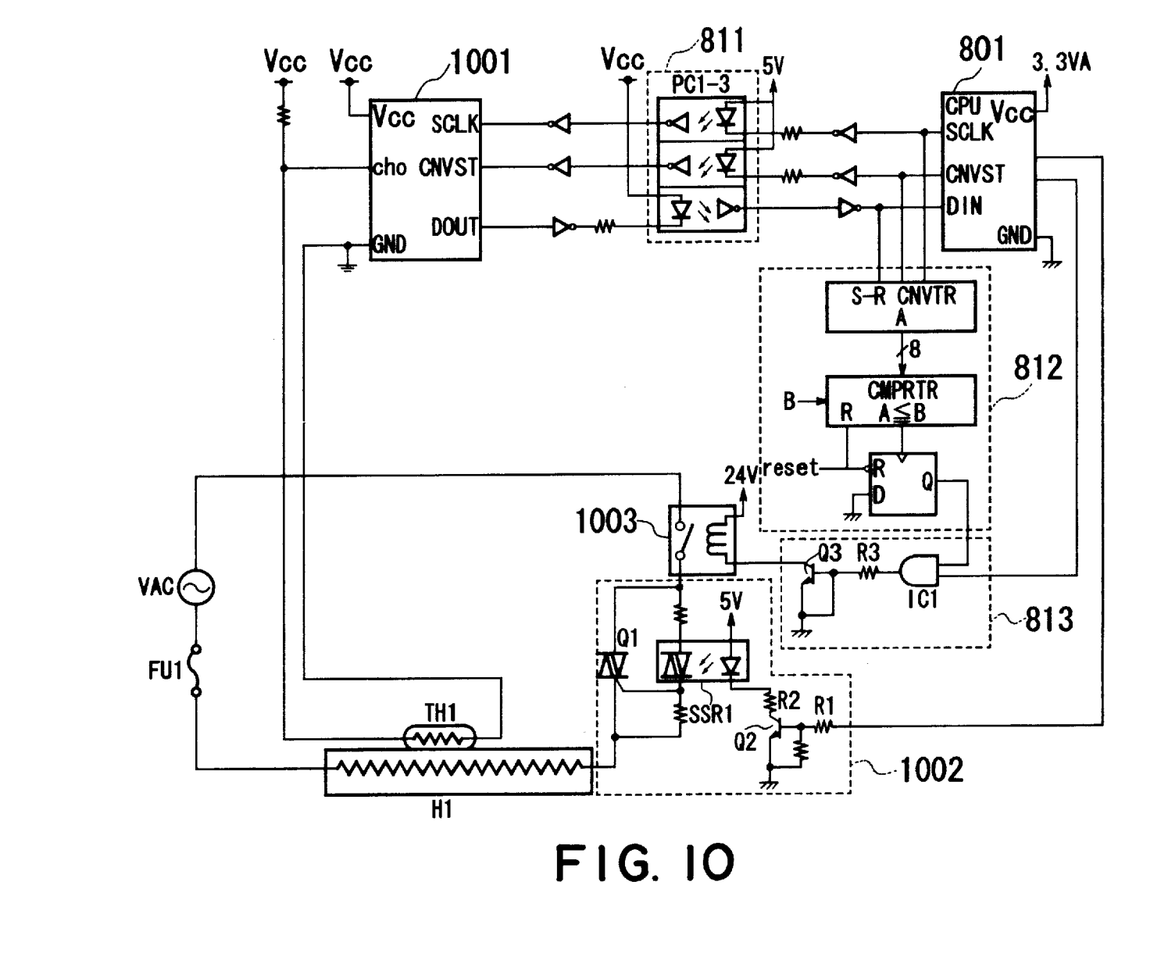
FIG. 10 is a block diagram of a fixing device control a system according to an embodiment of the present invention.

FIG. 10 is a block diagram showing signal paths for the fixing device control in the image forming apparatus of this embodiment. The heating portion 9 includes a heater HI (heat generating element) which generates heat up on electric power supply thereto from the commercial voltage source VAC, and a thermister TH1 (temperature detection member) for detecting the temperature of the heater H1.

The heater H1 is provided on one side of the substrate mainly comprising ceramic material, and the thermister TH1 is provided on the other side of the substrate.

In the printer portion 150 of the main assembly of the copying machine 100 humming the heating portion 9, there are provided a heat generating element control means (switching means) 1002 which is switchable between on-state for the conduction (electric energization) from the commercial voltage source VAC to the heater HI and off-state; temperature control means (CPU) 801 for switching to heat generating element control means 1002 in accordance with that detected temperature provided by the thermister TH1; A/D converter 1001 for detecting the temperature information of the thermister TH1; photoelectric converting means (photo-couplers PCI-PC3) for converting the data exchanged by the A/D converter 1001 and the temperature control means (CPU) 801 (light one electric signal); abnormal temperature detecting means 812 for detecting the abnormality in the temperature information provided by the temperature detection member for detecting the temperature of the heat generating element; a voltage source blocking mechanism 1003 for stopping the heater voltage source upon the detection of the abnormal temperature; and voltage source blocking control means 813 for controlling the voltage source blocking mechanism 1003 on the basis of the detection result of the abnormal temperature detecting means 812.

Figure 11:
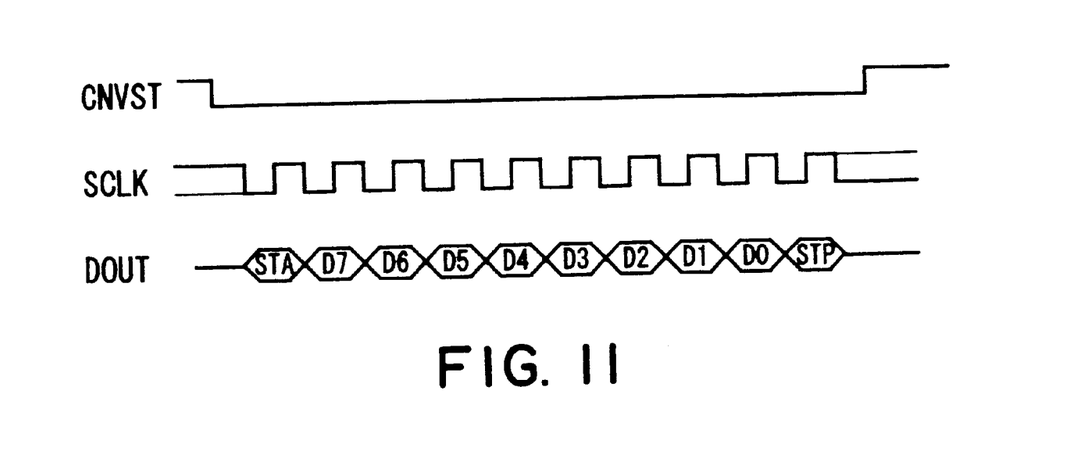
FIG. 11 is a timing chart showing the data exchange timing between the A/D converter and the temperature control circuit according to an embodiment of the present invention.

Referring to FIG. 11, the exchange of the date between the A/D converter 1001 and the temperature control circuit will be described.

The CPU which is the temperature control means 801 renders LOW the CNVST signal which is a conversion start signal, and the CNVST signal is inputted to the A/D converter 1001 through the photo-coupler PC2, and the A/D converter 1001 detects the falling of the CNVST signal and starts the A/D conversion operation for the temperature information from the temperature detection member. The CPU801 sequentially transmits the serial clock SCLK to the A/D converter 1001 through the photo-coupler PCI, and the A/D converter 1001 transmits the start bit, the A/D converted the data (8 bits) and the stop bit in this order in synchronism with the serial clock from the DOUT port of the A/D converter 1001 through the photo-coupler PC3 to the DIN port of the CPU801.

In this manner, the CPU801 is supplied with the temperature information from the temperature detection member. The CPU801, after detecting the temperature, renders HIGH the CNVST signal.

In the normal image forming operation, the above-described operations are carried out for each 2 msec approximately to detect the temperature of the heater Hl.

On the other hand, the commercial voltage source VAC supplies the electric power to the heater Hl provided in the heating portion 9 through the TRIAC Ql. A thermister THl is provided adjacent the heater Hl.

The description will be made as to the operations of the above-described means in the image forming operation.

In the normal image forming operation, the temperature control means 801 is supplied with information relating to the temperature of the heater Hl by receiving, through the photoelectric converting means 811, the data converted by the A/D converter 1001 and indicative of the change of the resistance of the thermister TH1 of the heater Hl. The heat generating element control circuit 1002 effects its control operation so as to maintain the temperature at a constant level.

The TRIAC Ql of the heat generating element control circuit 1002 is connected with a transistor Q2 through the photo-TRIAC coupler SSRl at one side thereof, and through the CPU801 in the secondary side and the resistance Rl at the other side thereof. In response to the HIGH, LOW signals from the CPU, a current is supplied to the diode side of the photo-TRIAC coupler SSRl through the limiting resistance R2 to on/off-controls the electric power supply from the commercial voltage source to the heater Hl.

In the normal image forming operation, the CPU801 supplies HIGH to the input portion of ICl in the voltage source blocking control circuit 813. If the abnormal temperature detection circuit does not detect the abnormal temperature on the basis of the output of the comparator, the output of the latch is HIGH (after the rest release) since the output of the abnormal temperature detection circuit is LOW.

So, the output of the ICl of the voltage source blocking control circuit 813 is HIGH; the transistor Q3 connected to the resistance R3 is at on-state; and therefore, the voltage source blocking means 1003 (relay) is rendered ON, so that heater Hl is energized.

The description will be made as to the operations of the above-described means in case of temperature abnormality occurrence during the image forming operation.

In case that heat generating element control means 1002 fails with the results that TRIAC Ql is kept at the on-state, the temperature of the heater Hl rises to such an extent that heater is liable to be broken by the resultant heat stress. If this occurs, the electric discharging starts between films of the thick film resistor at the broken point. Since temperature of the parts around the heat is high, and the combustible materials may relatively easily fires or smokes.

The abnormal temperature detecting means 812 converts, using the serial/parallel conversion portion, into parallel 8 bit data (A) the serial data supplied to the temperature control means (CPU) 801 through the photoelectric converting means from the A/D converter 1001. The data are compared with a predetermined value B by the comparator portion. If A≦B, the abnormal temperature is discriminated, and the comparator portion outputs HIGH.

This actuates the latch to render the output thereof LOW. This renders the output of the voltage source blocking control circuit 813 LOW, and therefore, the transistor Q3 is switched to off-state so as to disconnect the relay of the voltage source blocking circuit 1003 to stop the electric energization of the heater Hl.

Even if the temperature of the heater Hl becomes lower than the set temperature, the output of the latch does not revert so that rest state of the heater is maintained, thus assuring the safety during on-state of the main switch. Restoration from the state is accomplished by a resetting operation in the comparator latch in response to the actuation and deactuation of the voltage source.

It is possible to detect the abnormal temperature also by the temperature control circuit 801 and render the relay of the voltage source blocking mechanism 1003 OFF. As a result, the electric energization to the heater HI can be stopped by two means, namely, the temperature control circuit 801 and the detecting means 812, so that redundant safety system is provided.

After the output of the thermister TH1 which is the temperature detecting member is A/D-converted, the signal is supplied to the abnormality detecting means through the photo-coupler comprising an emitting portion having an electro-photo converter and comprising a light receiving portion photo-electro converter. Since input side and the output side of the photo-coupler is electrically insulated, the electrical safety is reliable.

With above-described structure, the necessity for providing the distance between the heat generating element which is the primary side circuit and the temperature detection member which is the secondary side circuit is reduced, and the safety circuit is provided together with the advantages of small size and low cost, for the heating apparatus, the fixing device and the image forming apparatus having the fixing device.

While the invention has been described with reference to the structures disclosed herein, it is not confined to the details set forth and this application is intended to cover such modifications or changes as may come within the purpose of the improvements or the scope of the following claims.

What is claimed is:

1. An image heating apparatus, comprising:
 a heat generating member for generating heat upon electric energy supply thereto;
 a base plate for supporting said heat generating member;
 a temperature detecting element for detecting a temperature of said base plate;
 A/D conversion means for converting an output of the temperature detecting element to a digital signal;
 photo-coupling means for converting an output of said A/D conversion means to an optical signal; and
 abnormality discriminating means for discriminating abnormality of said apparatus on the basis of an output of said temperature detecting element through said photo-coupling means, wherein when said abnormality discriminating means discriminates an abnormality the electric energy supply to said heat generating member is stopped.

2. An apparatus according to claim 1, further comprising control means for controlling the electric energy supply to said heat generating member so that output of said temperature detecting element is at a predetermined level.

3. An apparatus according to claim 2, wherein said control means is responsive to an output of said temperature detecting element through said photo-coupling means to control an amount of the electric energy supplied to said heat generating member.

4. An apparatus according to claim 1, wherein said base plate mainly comprises ceramic material.

5. An apparatus according to claim 1, wherein said temperature detecting element detects the temperature at a side of the base plate which is opposite from the side supporting the heat generating member.

6. An apparatus according to claim 1, further comprising stopping means for stopping electric energy supply of said heat generating member when said abnormality discriminating means detects an abnormal temperature.

7. An apparatus according to claim 1, wherein said image heating apparatus is used as a heat-fixing device in an image forming apparatus.

8. An apparatus according to claim 1, further comprising shut-off means for stopping supply of the electric energy to said heat generating member upon the abnormality of the apparatus.

* * * * *

UNITED STATES PATENT AND TRADEMARK OFFICE
CERTIFICATE OF CORRECTION

PATENT NO. : 6,640,064 B2
DATED : October 28, 2003
INVENTOR(S) : Hidehiko Kinoshita It is certified that error appears in the above-identified patent and that said Letters Patent is hereby corrected as shown below:

<u>Title page,</u>
Item [75], Inventor:, "Chiba-ken" should read -- Kashiwa --.

<u>Column 1,</u>
Line 26, "used" should read -- used in --.

<u>Column 2,</u>
Line 17, "smokes" should read -- smoke --.
Line 18, "fires" should read -- fire --.

<u>Column 3,</u>
Line 42, "lit on," should read -- lit, --.
Line 61, "transfer" should read -- transferred --.

<u>Column 4,</u>
Line 16, "image is" should read -- images --.
Line 21, "description" should read -- descriptions --.
Line 34, "supply" should read -- supplied --.
Line 46, "An user" should read -- A user --.

<u>Column 5,</u>
Line 5, "receives" should read -- received --.
Line 11, "they" should read -- the --.

<u>Column 6,</u>
Line 2, "controlled" should read -- controlled by --.
Line 13, "th" should read -- the --.
Line 16, "by 205$l$" should read -- by 205$i$ --.
Line 42, "send" should read -- sends --.
Line 57, "process" should read -- processes --.
Line 60, "t image" should read -- the image --.

<u>Column 7,</u>
Line 19, "outputs a" should read -- outputs --.
Line 27, "pedestall" should read -- pedestal --.

<u>Column 9,</u>
Line 63, "fires or smokes" should read -- fire or smoke --.

UNITED STATES PATENT AND TRADEMARK OFFICE
CERTIFICATE OF CORRECTION

PATENT NO. : 6,640,064 B2
DATED : October 28, 2003
INVENTOR(S) : Hidehiko Kinoshita It is certified that error appears in the above-identified patent and that said Letters Patent is hereby corrected as shown below:

<u>Column 10,</u>
Line 34, "With" should read -- With the --.

Signed and Sealed this

Thirtieth Day of March, 2004

JON W. DUDAS
*Acting Director of the United States Patent and Trademark Office*